(12) United States Patent
Bubat et al.

(10) Patent No.: US 8,304,077 B2
(45) Date of Patent: Nov. 6, 2012

(54) METAL EFFECT PIGMENTS, METHOD FOR THE PRODUCTION AND THE USE THEREOF AND POWDER COATING

(75) Inventors: Alfred Bubat, Wesel (DE); Wolfgang Griesel, Hamminkeln (DE); Phu Qui Nguyen, Mönchengladbach (DE); Hans-Jörg Kremitzl, Eckental (DE)

(73) Assignees: Eckart GmbH (DE); BYK-Chemie GmbH (DE)

( * ) Notice: Subject to any disclaimer, the term of this patent is extended or adjusted under 35 U.S.C. 154(b) by 41 days.

(21) Appl. No.: 13/002,087

(22) PCT Filed: Jul. 8, 2009

(86) PCT No.: PCT/EP2009/004944
§ 371 (c)(1),
(2), (4) Date: Feb. 17, 2011

(87) PCT Pub. No.: WO2010/003660
PCT Pub. Date: Jan. 14, 2010

(65) Prior Publication Data
US 2011/0160389 A1    Jun. 30, 2011

(30) Foreign Application Priority Data
Jul. 8, 2008    (DE) .................. 10 2008 031 901

(51) Int. Cl.
*C09C 3/10* (2006.01)
*C09C 3/12* (2006.01)
*C09D 5/03* (2006.01)

(52) U.S. Cl. ........ 428/403; 106/272; 106/400; 106/425; 106/437; 106/450; 106/453; 106/456; 106/482; 106/490; 428/404; 428/405; 523/200; 523/201; 523/209; 523/212; 524/904

(58) Field of Classification Search .................. None
See application file for complete search history.

(56) References Cited

U.S. PATENT DOCUMENTS

| | | | |
|---|---|---|---|
| 5,332,767 A | 7/1994 | Reisser et al. | |
| 5,964,936 A | 10/1999 | Reisser | |
| 6,239,194 B1 | 5/2001 | Standke et al. | |
| 6,547,869 B2 | 4/2003 | Witt | |
| 6,547,870 B1 | 4/2003 | Griessmann et al. | |
| 6,761,762 B1* | 7/2004 | Greiwe et al. ............. | 106/403 |
| 6,972,305 B1 | 12/2005 | Griessmann et al. | |
| 7,576,229 B2 | 8/2009 | Schaefer et al. | |
| 7,585,993 B2 | 9/2009 | Haubennestel et al. | |
| 2003/0161805 A1 | 8/2003 | Schlossman et al. | |
| 2006/0000389 A1 | 1/2006 | Duguet et al. | |
| 2007/0166544 A1* | 7/2007 | Hennemann et al. ....... | 428/405 |
| 2008/0249209 A1 | 10/2008 | Trummer et al. | |
| 2010/0048809 A1* | 2/2010 | Nolte et al. ............. | 524/588 |

FOREIGN PATENT DOCUMENTS

| | | |
|---|---|---|
| DE | 4030727 A1 | 4/1992 |
| DE | 4317019 A | 12/1993 |
| DE | 19520312 A1 | 12/1996 |
| DE | 19820112 A1 | 11/1999 |
| DE | 10046152 A1 | 3/2002 |
| DE | 102005005046 A1 | 8/2006 |
| DE | 102005037611 A1 | 2/2007 |
| DE | 102007030285 A1 | 2/2008 |
| EP | 0955344 A2 | 11/1999 |
| EP | 1076266 A1 | 2/2001 |
| EP | 1084198 B1 | 7/2002 |
| EP | 1200527 B1 | 5/2004 |
| EP | 1690884 A1 | 2/2005 |
| EP | 1104447 B1 | 5/2005 |

(Continued)

OTHER PUBLICATIONS

International Search Report dated Nov. 23, 2009, issued in corresponding international application No. PCT/EP2009/004944.

(Continued)

*Primary Examiner* — Marc Zimmer
(74) *Attorney, Agent, or Firm* — Ostrolenk Faber LLP

(57) ABSTRACT

Metallic effect pigments with a platelet-shaped metallic substrate. The pigments have at least one metal oxide layer. Covalently bonded to the surface of the metal oxide layer is a polysiloxane of formula I:

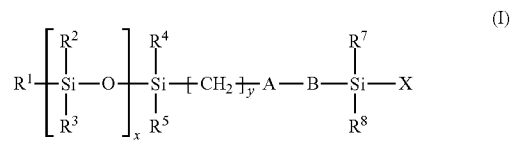

where $R^1$ is a saturated or unsaturated, straight-chain or branched alkyl radical having 1 to 30 carbon atoms and/or an aryl radical, alkylaryl radical or arylalkyl radical having 6 to 30 carbon atoms; $R^2$, $R^3$, $R^4$ and $R^5$ independently of one another are saturated or unsaturated, straight-chain or branched alkyl radicals having 1 to 6 carbon atoms and/or aryl radicals, alkylaryl radicals and/or arylalkyl radials having 6 to 12 carbon atoms; x=1 to 200, y=2 to 30; A is $(CH_2)_n$, O, S, $(OCH_2CH_2)_m$ or $C_6R^6_4$, where n=0 or 1 and m=0 to 30 and $R^6$ is H and/or alkyl having 1 to 6 carbon atoms; B is $(CH_2)_z$ or $(OCH_2CH_2)_w$, z=0 to 30 and w=0 to 30; and $R^7$ and $R^8$ independently of one another are O or a saturated or unsaturated, straight-chain or branched alkyl radical having 1 to 6 carbon atoms and/or an aryl radical, alkylaryl radical or arylalkyl radical having 6 to 9 carbon atoms, where X is O or OH and is attached to the pigment surface. The disclosure further relates to a method for producing metallic effect pigments and to their use in powder coatings, more particularly in powder coatings produced by mixing methods, as well as to the use of these powder coatings. Finally, the disclosure also relates to powder coatings.

25 Claims, No Drawings

FOREIGN PATENT DOCUMENTS

| | | |
|---|---|---|
| EP | 1619222 A1 | 1/2006 |
| EP | 1174474 B1 | 4/2006 |
| EP | 1655349 A1 | 5/2006 |
| EP | 1558684 B1 | 1/2007 |
| EP | 1812519 A2 | 8/2007 |
| JP | 2003213157 A | 7/2003 |
| WO | WO 2008/017364 A | 2/2008 |

OTHER PUBLICATIONS

German Search Report dated Jul. 10, 2008, issued in corresponding German priority application No. DE 10 2008 031 901.5-44.

Pietschmann, J. Industrielle Pulverbeschichtung, 1. Edition, Oct. 2002, pp. 28-29.

* cited by examiner

METAL EFFECT PIGMENTS, METHOD FOR THE PRODUCTION AND THE USE THEREOF AND POWDER COATING

CROSS REFERENCE TO RELATED APPLICATIONS

The present application is a 35 U.S.C. §371 National Phase conversion of PCT/EP2009/004944, filed Jul. 8, 2009, which claims benefit of German Application No. 10 2008 031 901.5, filed Jul. 8, 2008, the disclosure of which is incorporated herein by reference. The PCT International Application was published in the German language.

TECHNICAL FIELD

The invention relates to metallic effect pigments for preferred use in powder coatings. The invention further relates to a method for producing these metallic effect pigments and to their use in powder coatings, to a powder coating, and to the use of these powder coatings.

BACKGROUND

Metallic effect pigments provide applications, such as paints and coatings, for example, with lustrous, brilliant effects, and fulfill functional requirements.

A key requirement of metallic effect pigments is the directed reflection of light at parallel-oriented pigment platelets. The peculiarity of applications with this kind of pigmentation is the pronounced angular dependence of the optical impression they feature; in other words, as the viewing angle changes, there are also changes in the lightness and, occasionally, in the color shade of the application as well.

Powder coatings are finding continually increasing use as solid and solvent-free coating materials in industrial mass production for the coating of electrically conductive and temperature-stable materials. The powder coatings, which are used as a primer or one-coat topcoat, are almost completely recyclable.

The powder coatings, which are eco-friendly and have diverse possible uses, comprise binders, pigments, fillers, and crosslinkers, and optionally additives as well.

Powder coatings are present in a finely divided form, and are generally applied electrostatically to various substrates and cured by baking or by radiation energy.

For the production of powder coatings, in a conventional mixing method, the raw materials for the coating, optionally after premixing in a solids mixer, are introduced into an extruder and homogenized in the melt at 80 to 140° C. The extrudate discharged from the extruder, cooled, and comminuted is subjected to an intense milling operation until the desired particle size is present.

For the pigmentation of powder coatings use is made, in addition to commercial chromatic pigments, of effect pigments produced by conventional ball mill grinding, such as, for example, platelet-shaped metallic effect pigments made of aluminum, copper, copper-zinc alloys or zinc.

The use of commercial platelet-shaped metallic effect pigments in powder coatings produced by mixing methods is problematic in that the shearing forces which act on the pigment platelets in the course of the extrusion and grinding operation can result in damage to or destruction of the pigment platelets, thereby causing negative impairment of, in particular, the gloss, and hence also of the optical qualities of the applications pigmented with these metallic effect pigments. This may go as far as the complete disappearance of the typical optical properties of the metallic effect pigments (brilliance, luster, flop, etc.) in the powder coating.

In order to prevent this, for example, the effect pigments used to pigment powder coatings are not mixed into the base powder coating until after the grinding procedure. A significant disadvantage of this powder coating production method, which is known as the dry-blend method, is the possible separation of pigment and powder coating during application of the coating material, owing to the different charging characteristics of the individual coating constituents. The consequence of this depletion or accumulation of pigment in the course of powder coating application is an irregular optical effect in the coated article. Moreover, the separation of pigment and binder makes it impossible fully to recover and re-use the environmentally damaging "overspray", as it is called.

A further method for powder coating production is that known as the bonding method, in which the pigment is fixed to the particles of the basecoat by heating. The production of bonding powder coatings of this kind that can be used for optical high-grade coatings, however, is relatively costly.

The powder coatings that are presently the most cost-effective are produced by means of mixing methods. For such methods, the pigments are mixed together with all of the other raw materials, extruded, and ground. With this powder coating production operation, there is no need for the otherwise necessary worksteps of "dry blending" and/or "bonding".

Powder coatings produced by mixing methods are pigmented with metallic effect pigments using, for example, dust-free gold-bronze and aluminum pigment preparations, which are traded commercially under the name "Powder-Safe®" by ECKART GmbH, 91235 Velden. Although the one-coat finishes pigmented with these platelet-shaped metallic effect pigments have a very good metallic appearance, they are not sufficiently abrasion-stable for specific use purposes. Also the applications pigmented with these commercial metallic effect pigments cannot be additionally protected from mechanical and/or chemical influences by a clearcoat coating, as certain outdoor applications require. The reason for this is that the metallic effect pigments introduced in the powder coating have substantial leafing properties—that is, during the baking procedure, the pigment platelets float in the coating film and undergo alignment and ordering in the region of the film surface. These pigments thus then prevent effective attachment of the clearcoat to the basecoat, meaning that the powder coating is no longer resistant to abrasion.

For powder coating production by the bonding or dry-blend method, moreover, a large number of surface-coated/-modified effect pigments are used. These commercial pigments are, however, not resistant to damage and/or destruction due to the shearing forces that occur in the course of extrusion/grinding.

Effect pigments of this kind are traded, for example, by Merck under the name Iriodin®. These pearlescent pigments comprise mica platelets coated with metal oxides.

The Merck company also has surface-modified pearlescent pigments on the market that are coated with a polymer compound and are described in DE-A 43 17 019, for example.

Also employed for the pigmentation of powder coatings are coated $Al_2O_3$ platelets, bismuth oxychloride (BiOCl), aluminum flakes, Variochrom® or Paliochrom® pigments from BASF, LCP pigments (liquid crystal polymer pigments), and coated glass flakes or multilayer pigments.

Also known from EP 1 174 474 B1 is the use of $SiO_2$ platelets or aluminum flakes coated with low molecular mass polyethylene or polypropylene.

In contrast, EP 1 558 684 B1 relates to a silane-modified pigment composition for use in metalized paints, printing inks, and plastics material. It is produced by grinding atomized aluminum powder by the known Hall process in the presence of silane instead of the fatty acids typically employed in that milling process. These aluminum effect pigments can be used in both aqueous and solventborne coating systems, on account of their improved corrosion resistance. The optical pigment properties are comparable with those of aluminum effect pigments produced by the conventional wet milling process.

Moreover, EP 1 084 198 B1 describes effect pigments with surface-modified orientation assistants. The orientation assistant, which is present in monomeric or polymeric form, carries at least two different functional groups, which are separated from one another by a spacer. One of the functional groups is attached chemically to the pigment, while the other is able to react, for example, with the binder of the pigment-surrounding varnish in a kind of crosslinking reaction and hence to contribute to the stabilization of the effect pigment with nonleafing quality.

DE 10 2005 037 611 A1 discloses metallic effect pigments with a hybrid inorganic/organic layer, possessing not only high mechanical stability but also good gassing stability. For this purpose, organic oligomers and/or polymers are joined to an inorganic network consisting of inorganic oxide components, the join being at least partly covalent via network formers. The network formers may inter alia be organo-functional silanes. The inorganic oxide component is constructed—when $SiO_2$ is present—from, for example, tetraalkoxy-silanes. The application of a hybrid inorganic/organic layer requires a somewhat more complicated control of the process than when applying a coating composed of just one component.

EP 1 619 222 A1 discloses aluminum effect pigments having a silane-modified molybdenum- and silicon-oxide coating for water-based coating systems.

EP 1 655 349 A1 relates to recoatable effect powder coatings for good attachment of the clearcoat. These effect powder coatings comprise effect pigments which have been enveloped with a fluorine-containing polymer coating, but which do not afford adequate protection against destruction of the pigments under a shearing load. These pigments, therefore, can be incorporated only by the dry-blend or bonding method in the course of powder coating production.

JP 2003213157A discloses a metallic pigment for a powder coating composition with a high metallic luster. This aluminum pigment, which can be employed in single-coat or multicoat powder coating finishes, is coated with at least one resin component containing a fluorinated alkyl group. The coated aluminum effect pigments disclosed therein are employed in the powder coating by means of dry-blending or by bonding.

Further pigment preparations which, as well as effect pigments and other ingredients, also contain surface-active substances, such as alkylsilanes, for example, are described in DE 10 046 152A1, EP 1 104 447 B1, and EP 1 200 527 B1.

EP 0 955 344 A2 discloses organosiloxane-modified fillers which are used as additives to adhesives, sealants, polymer compositions, etc.

EP 1 076 266 A1 discloses a black toner which comprises particles of hematite or of iron oxide, the particles being provided first with a layer of organosilane and polysiloxane and thereafter with a carbon black layer.

US 2003/0161805 A1 discloses a coated powder for use in cosmetics. The powder may constitute a multiplicity of color pigments coated with a polysiloxane having basic groups, more particularly amino groups. The ratio of siloxy groups without a basic group to siloxy groups with a basic group is situated in the range from 5:1 to 1:5 and is preferably 1:1.

EP 1 690 884 A1 discloses organosilane-modified polysiloxanes for surface coating, of fillers and pigments, for example, such as titanium dioxide pigments, which then, by virtue of their hydrophobic quality, can be incorporated effectively into plastics.

SUMMARY

It is an object of the present invention to provide metallic effect pigments for powder coatings. These metallic effect pigments are to be suitable for use more particularly in powder coatings which are produced by mixing methods and have high abrasion stability and high-grade optical properties, especially in inexpensive single-coat finishes. Furthermore, the metallic effect pigments ought to be inexpensively producible.

The object has been achieved by provision of metallic effect pigments with platelet-shaped metallic substrate, the metallic effect pigments having at least one metal oxide layer, the surface of the metal oxide layer having covalently bonded polysiloxane of the formula I:

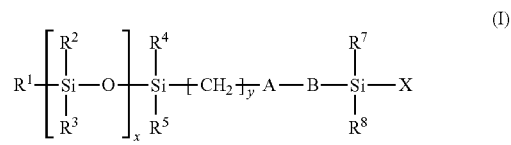

where $R^1$ is a saturated or unsaturated, straight-chain or branched alkyl radical having 1 to 30 carbon atoms and/or an aryl radical, alkylaryl radical or arylalkyl radical having 6 to 30 carbon atoms;

$R^2$, $R^3$, $R^4$ and $R^5$ independently of one another are saturated or unsaturated, straight-chain or branched alkyl radicals having 1 to 6 carbon atoms and/or aryl radicals, alkylaryl radicals and/or arylalkyl radials having 6 to 12 carbon atoms;

x=1 to 200, y=2 to 30;

A is $(CH_2)_n$, O, $S(OCH_2CH_2)_m$ or $C_6R^6_4$, where n=0 or 1 and m=0 to 30 and $R^6$ is H and/or alkyl having 1 to 6 carbon atoms;

B is $(CH_2)_z$ or $(OCH_2CH_2)_w$, z=0 or 30 and w=0 to 30; and $R^7$ and $R^8$ independently of one another are O or a saturated or unsaturated, straight-chain or branched alkyl radical having 1 to 6 carbon atoms and/or an aryl radical, alkylaryl radical or arylalkyl radical having 6 to 9 carbon atoms, where X is O or OH and is attached to the pigment surface.

The attachment to the pigment surface may be accomplished covalently, ionically and/or by way of van de Waals forces and/or hydrogen bonds. In accordance with one variant, attachment to the pigment surface is accomplished, at least partially, through a covalent bond.

Preferred developments of the metallic effect pigments of the invention are indicated in dependent claims 2 to 9.

The object has further been achieved by provision of a method for producing the metallic effect pigments of the invention, where the surface of the metal oxide layer is reacted with a polysiloxane of the formula (II),

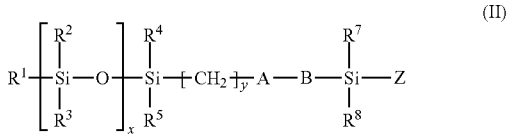

(II)

preferably under hydrolytic conditions, where Z is a hydrolyzable group and $R^7$ and $R^8$ independently of one another are each a hydrolyzable group or $R^7$ and $R^8$ independently of one another are a saturated or unsaturated, straight-chain or branched alkyl radical having 1 to 6 carbon atoms and/or an aryl radical, alkylaryl radical or arylalkyl radical having 6 to 9 carbon atoms.

The hydrolyzable group Z comprises, for example, hydroxide, halogen, as for example F, Cl, Br and/or I, and/or $OR^9$ and/or $O(C\!\!=\!\!O)R^9$, where $R^9$ is a saturated, straight-chain or branched alkyl radical having 1 to 6 carbon atoms, it being possible for the alkyl radical to comprise O.

In the case of the present invention, the polysiloxane of formula (I) is a polysiloxane which is attached to the pigment surface by at least one (number: 1) oxygen atom or one (number: 1) hydroxyl group. the polysiloxane of formula (II) identifies the poly-siloxane prior to hydrolysis, i.e., the starting substance, which after hydrolysis attaches to the pigment surface.

The object has been further achieved by provision of a powder coating comprising at least one binder and also metallic effect pigments of the invention.

The object has further been achieved by provision of a method for producing a powder coating,
which comprises the following steps:
(a) mixing, preferably extruding, a metallic effect pigment of any of claims 1 to 9, together with binder and, optionally, further constituents of a powder coating,
(b) optionally grinding the extrudate obtained in step (a).

The object on which the invention is based is further achieved by the use of metallic effect pigments of any of claims 1 to 9 in coatings, printing inks, cosmetic formulations, plastics or in powder coating.

The object of the invention is achieved, moreover, through the use of metallic effect pigments as claimed in any of claims 1 to 9 for producing powder coatings by means of mixing methods, preferably by extrusion of a mixture of metallic effect pigments and powder coating binder and subsequent grinding of the resulting extrudate.

DETAILED DESCRIPTION

In the context of this invention, methods for producing a powder coating that comprise the mixing, preferably the extrusion, of all of the components of the powder coating, including the metallic effect pigments of the invention, and also the optional subsequent grinding of the extrudate, are called "mixing methods".

In the case of the metallic effect pigments of the invention, the polysiloxane of formula (I) is bonded preferably via one or more oxygen atoms to the metal oxide layer, preferably covalently. The polysiloxane is bonded to the metal oxide layer via one (number: 1) oxygen atom when $X\!\!=\!\!O$ and $R^7$ and $R^8$ are not O but are instead alkyl or aryl radical. Attachment of the poly-siloxane of formula (I) by two oxygen atoms may take place when, in addition to $X\!\!=\!\!O$, either $R^7$ or $R^8$ is also O. Attachment, preferably covalent bonding, of the polysiloxane of formula (I) by three oxygen atoms may take place, when, in addition to $X\!\!=\!\!O$, $R^7$ and $R^8$ are also O as well. Even if $R^7$ and/or $R^8$ are each an oxygen atom, there must not necessarily be direct bonding via three or two oxygen atoms, respectively, to the surface of the metal oxide layer. It is also possible for an oxygen-bridged bond to be formed to one or to two or more other polysiloxanes of formula (I), following hydrolysis of the starting compound with condensation of the resultant hydroxyl groups and subsequent elimination of water. Accordingly, the covalent bonding of a polysiloxane of formula (I) may also take place indirectly to the metal oxide surface. Attachment to the pigment surface may also take place via ionic interactions, van der Waals forces and/or hydrogen bonds.

The attachment of the polysiloxane of formula (I) may of course also take place directly to the metal oxide surface of the metallic effect pigment via one (number: 1), two or three oxygen atoms.

It has emerged, surprisingly, that the metallic effect pigments of the invention coated with a polysiloxane of formula (I) can be compacted together with powder coating resin, by means of extrusion, for example, without any notable deterioration in the optical properties of the metallic effect pigments. The extrudate obtained can then be ground to a desired particle size, in which case, surprisingly, there is likewise no substantial deterioration in the optical properties of the metallic effect pigments. Accordingly, a powder coating or powder coating concentrate in the form of a masterbatch can thus be provided directly, with the strong mirror properties of the metallic effect pigments being retained.

The coating with the polysiloxane of formula (I) therefore produces surprisingly effective protection of the metallic effect pigments with regard to mechanical loading.

Furthermore, it has been found, surprisingly, that the metallic effect pigments of the invention, as compared with metallic effect pigments provided with a fluorine-containing coating, have substantially improved recoating properties.

Therefore, following application by means of powder coating and subsequent application of a clearcoat, the metallic effect pigments of the invention can be exposed even to harsh ambient conditions, such as humidity, severe temperature fluctuations, etc.

Furthermore, following application by means of powder coating, the metallic effect pigments of the invention have shown improved flow or leveling behavior as compared with metallic effect pigments provided with a fluorine-containing coating. On the basis of the improved flow behavior after coating, preferably powder coating, the surface of the coating is smoother and more even.

The platelet-shaped substrate is enveloped preferably substantially by the metal oxide coating, with the enveloping metal oxide coating preferably comprising or consisting of oxides and/or oxide hydrates of silicon, titanium, zirconium, iron, aluminum, cerium, chromium and/or mixtures thereof.

The metal oxide coating envelopes the platelet-shaped substrate preferably to an extent of at least 90%, more preferably at least 95%, more preferably still at least 99%, very preferably to an extent of 100%. The figure in % here relates to the fraction of the substrate surface that is enveloped, relative to the whole of the substrate surface.

The metallic effect pigments of the invention preferably comprise a platelet-shaped metallic substrate which is selected from the group consisting of aluminum, copper, zinc, tin, brass (gold bronze), iron, titanium, chromium, nickel, silver, gold, steel, and also their alloys and/or mixtures. Preferred in this context are aluminum, iron and/or brass, and aluminum and/or brass are particularly preferred.

The metallic effect pigments of the invention have a plateletlike form, having a plateletlike metal core on which are applied, optionally, one or more separate metal oxide layers, the polysiloxane of formula (I) being bonded covalently on the outermost metal oxide layer.

These metallic effect pigments, produced by conventional ball mill grinding of metal powder, preferably have an average particle diameter of 2 to 200 µm, more preferably 6 to 100 µm, and very preferably 8 to 75 µm.

The average particle thickness of the metallic effect pigments of the invention is preferably 0.02 to 5 µm, more preferably 0.02 to 2.0 µm, and with particular preference 0.05 to 1.0 µm. These figures relate to the metallic core and not to any other coatings that may be present.

It is of course also possible, as the metallic effect pigments to be coated, to use PVD pigments, optionally provided with one or more separate metal oxide layers, preferably aluminum PVD pigments, and for the sizes and thicknesses to be situated within the aforementioned range. The thickness of the PVD pigments, however, is situated preferably in a range from 20 nm to 100 nm, more preferably from 30 to 60 nm.

Above an average size of 200 µm, the metallic effect pigments can usually no longer be used to good effect for the powder coating. Below 2 µm average size, the metallic effect achievable is generally no longer satisfactory.

The ratio of average particle diameter to average particle thickness (form factor) is preferably greater than 5, more preferably greater than 20, very preferably greater than 50.

The polysiloxane of formula (II) may be attached directly to the natural metal oxide layer that forms on a metal pigment. Attachment is generally and also preferably accomplished with condensation of one or more OH groups of the hydrolyzed polysiloxane, in which the group Z and possibly the groups $R^7$ and $R^8$ have been replaced by hydroxyl groups, which subsequently condense with oxygen functions or OH groups that are present on the metal oxide layer, this condensation being accompanied by elimination of water.

A separate metal oxide layer is preferably applied to the metallic effect pigment, allowing a greater number of OH groups to be produced on the surface of the effect pigment, and hence allowing improved or strengthened attachment of hydrolyzed polysiloxane of formula (II).

Alternatively the attachment may take place, for example, via hydrogen bonds of noncondensed OH groups both of the polysiloxane and of surface OH groups of the metallic effect pigment.

The metallic effect pigments of the invention are provided with a metal oxide coating which preferably substantially envelops the metal platelets. According to one preferred variant of the invention, the at least one metal oxide layer has been applied to the platelet-shaped substrate by coating, i.e., in a separate step. The coating with metal oxides and/or metal oxide hydrates takes place preferably by precipitation or by sol-gel methods or by wet-chemical oxidation of the metal surface. The metal platelet metal and the metal oxide layer metal may be the same or different from one another.

For the metal oxide coating it is preferred to use oxides, hydroxides and/or oxide hydrates of silicon, titanium, zirconium, iron, aluminum, cerium, chromium and/or mixtures thereof. In the case of high-refractive-index and/or colored oxides, such as $TiO_2$, $Fe_2O_3$, $ZrO_2$, and $Cr_2O_3$, for example, these metal oxide coatings cause the metallic effect pigment to impart color.

Yellowish to brownish metal pigments are also obtained by wet-chemical oxidation of aluminum pigments (DE 195 20 312 A1).

In particular in the case of silicon oxides, silicon hydroxides or silicon oxide hydrates, and also in the case of aluminum oxides, aluminum hydroxides or aluminum oxide hydrates, the coated metallic effect pigments are well protected against corrosive effects. This is particularly advantageous if the metallic effect pigments are arranged as leafing pigments, in the case of a single-coat finish, at the surface of the coating and are therefore particularly highly exposed to corrosive influences. Consequently, coatings of or with the oxides, hydroxides or oxide hydrates of silicon and aluminum are particularly preferred, and those of silicon are especially preferred.

Furthermore, the metallic effect pigments may also have hybrid inorganic/organic layers, as are described in EP 1 812 519 A2, hereby incorporated by reference.

Coatings of this kind stabilize the ductile metallic effect pigments from mechanical influences as well. Thus the mechanical stability of the metallic effect pigments is increased, and so the pigments are destroyed or damaged to a far lesser extent, by the shearing forces that occur as a result of direct extrusion during powder coating production, than is the case with uncoated metallic effect pigments or with metallic effect pigments coated with organic protective layers. Nevertheless, metallic effect pigments coated in this way do not yield optically satisfactory results in powder coatings produced by mixing methods. The thicknesses of the metal oxide layers, more particularly of the protective silicon oxide, aluminum oxide and/or hybrid inorganic/organic layers, are situated in the range from preferably 5 to 60 nm and more preferably from 10 to 50 nm.

According to one preferred variant of the invention, the applied polysiloxane of formula (I) does not form an enveloping polymer coating. It has been found, surprisingly, that even very small amounts of polysiloxane of formula (I) are sufficient. The poly-siloxane of formula (I) is applied preferably directly to the metal oxide surface, without the use of a tie layer or coupling layer between metal oxide surface and surface modifier.

The polysiloxane of formula (I) is preferably formed as a separate layer on the surface of the metal oxide coating, but may alternatively be copolymerized—at least partially—into the metal oxide coating or may form a hybrid layer with the metal oxide coating.

The polysiloxane of formula (I) contains no basic groups and hence no amino groups.

According to one preferred embodiment, $R^2$, $R^3$, $R^4$ and $R^5$ in the polysiloxane of formula (I) are independently of one another saturated alkyl radicals such as methyl, ethyl, n-propyl, isopropyl, n-butyl, sec-butyl or tert-butyl and/or an aromatic radical such as phenyl.

$R^2$, $R^3$, $R^4$ and $R^5$ are preferably the same.

It has proven very suitable if $R^2$, $R^3$, $R^4$ and $R^5$ are each methyl.

Preferably $R^1$ is alkyl, cycloalkyl or aryl having 1 to 12 C atoms. It has been found very suitable for $R^1$ to be methyl, ethyl, sec-butyl, n-propyl, isopropyl, n-butyl, sec-butyl, tert-butyl, n-pentyl, neopentyl, cyclopentyl, n-hexyl, cyclohexyl, n-octyl, 2-ethylhexyl, phenyl, methylphenyl or ethylphenyl.

With further preference $R^1$ is unbranched alkyl having 1 to 6 carbon atoms. Preferably $R^1$ is methyl, ethyl, n-butyl, n-hexyl or phenyl. More preferably $R^1$ is n-butyl or n-hexyl.

According to one preferred embodiment, $R^1$ is different from $R^2$, $R^3$, $R^4$ and $R^5$. Preferably $R^1$ and also $R^2$, $R^3$, $R^4$ and $R^5$ are each alkyl radicals, with alkyl radical $R^1$ preferably having at least one carbon atom, more preferably at least 2 carbon atoms, even more preferably at least 3 carbon atoms, more than the alkyl radicals $R^2$, $R^3$, $R^4$ and $R^5$.

Very preferably $R^1$ is n-butyl or n-hexyl and $R^2$, $R^3$, $R^4$ and $R^5$ are each methyl.

In accordance with a further preferred embodiment, y=2 to 6, and A is $(CH_2)_n$, where n=0 and B is $(OCH_2CH_2)_w$, where w=0 to 6.

Preferably y=2 and A is $(CH_2)_n$, where n=0, and B is $(OCH_2CH_2)_w$, where w=0.

It is further preferred for it to be the case that on average $2 \leq x \leq 150$, preferably $2.5 \leq x \leq 100$, more preferably $3.0 \leq x \leq 80$, more preferably still $3.5 \leq x \leq 50$. The values for x here relate to average values, since the polysiloxanes are generally in the form of a polymer/oligomer mixture with different molecular weights.

The metallic effect pigments of the invention preferably have a metal oxide content of 0.1% to 50% by weight, preferably of 1% to 25% by weight, more preferably of 2% to 15% by weight. The formula (I) poly-siloxane content is situated preferably in a range from 0.1% to 10%, more preferably from 0.5% to 5%, with particular preference from 0.75% to 3%, by weight, based in each case on the overall pigment weight.

In a further advantageous embodiment of the invention, the coating with polysiloxane of formula (I) of the metal oxide-coated metallic effect pigments may comprise further adjuvants, examples being organic and/or inorganic chromatic pigments, dyes, corrosion inhibitors and/or UV stabilizers.

The metallic effect pigments of the invention having a metal oxide coating which is modified with polysiloxane of formula (I) and whose layer thickness is preferably low are inexpensively producible.

In the method of the invention, the surface of the metal oxide layer is reacted with a polysiloxane of the formula (II), preferably under hydrolytic conditions, where Z is a hydrolyzable group and $R^7$ and $R^8$ may optionally each be a hydrolyzable group.

The polysiloxane of formula (I) that is applied to the pigment surface may be applied in a variety of ways. Preference here is given to using a polysiloxane of the formula (II), where Z is a hydrolyzable group and $R^7$ and $R^8$ may optionally each be a hydrolyzable group.

The hydrolyzable group Z is preferably halogen, as for example F, Cl, Br and/or I, and/or $OR^9$ and/or $O(C=)R^9$, where $R^9$ is a saturated, straight-chain or branched alkyl radical having 1 to 6 carbon atoms, it being possible for the alkyl radical to comprise O.

Very preferably $OR^9$ stands for alkoxy radicals, more particularly methoxy, ethoxy, n-propoxy, isopropoxy, n-butoxy, sec-butoxy or isobutoxy. Methoxy and ethoxy have proven very suitable.

It is preferred, furthermore, for $O(C=O)R^9$ to be a fatty acid radical having 1 to 6 carbon atoms, more particularly acetate, propionate, butyrate.

The above-stated alkoxy radicals, fatty acid radicals or the halogen group can be hydrolyzed easily, the group(s) Z and also optionally $R^7$ and/or $R^8$ in formula (II) being replaced, as a result, by hydroxyl, which are then able to bond to the metal oxide coating with condensation, as described above, preferably with formation of at least one metal-O—Si bond, covalently, where metal is the metal or a metal of the metal oxide coating.

For example, a polysiloxane of formula (II) is dissolved in a commercially customary solvent, if desired also under hydrolytic conditions, as for example in water in the presence of acidic or basic catalyst, and is subsequently applied to the metal oxide-coated, platelet-shaped substrate and dried. Alternatively the coating with the polysiloxane of formula (II) may take place directly after the coating of the platelet-shaped, metallic substrate with at least one metal oxide layer, in a one-pot process.

It has been found, surprisingly, that the polysiloxane of formula (I) adheres very reliably to the surface of the metal oxide coating of the metallic effect pigments of the invention, and is stable even in the face of the mechanical shearing forces that act on the pigments in the event of powder coating preparation by direct extrusion. Mechanical comminution of the pigments occurs, at the earliest, in the grinding operation, and any fragments that may be formed in this operation continue to be coated with metal oxide layer and polysiloxane of formula (I), and hence contribute to the high-grade optical appearance. The metallic effect pigments of the invention and the powder coating applications pigmented with these metallic effect pigments of the invention also have better functional properties than powder coating applications pigmented with commercially customary metallic effect pigments, in terms of recoatability, abrasion resistance, lightness, and metallic luster.

The metallic effect pigments of the invention find use preferably in powder coatings having a pigment content of 0.1% to 20%, preferably of 0.2% to 10%, more preferably of 0.5% to 6%, by weight, based on the overall weight of the powder coating.

The subject matter of the invention also relates to the use of the metallic effect pigments of the invention in paints, printing inks, cosmetic formulations, plastics, and powder coatings, more particularly in powder coatings produced by direct extrusion.

Particularly preferred as powder coating component are polyester powder coatings, polyacrylate powder coatings, polyurethane powder coatings, epoxy powder coatings or polyester-epoxy powder coatings.

Furthermore, the powder coatings of the invention comprising the metallic effect pigments of the invention find use for the coating of substrates which comprise metal, metal foils, plastic, glass, glass fibers, composite materials, ceramic, wood, concrete, textile material, and woodbase materials, such as MDF boards, for example, or other materials suitable for decorative and/or protective purposes.

The invention also relates, furthermore, to a coated substrate coated with the powder coating of the invention or the metallic effect pigments of the invention.

The powder coating application of the invention may be coated with a single-layer or multilayer clearcoat.

A powder coating pigmented with metallic effect pigments of the invention and producible inexpensively by direct extrusion permits abrasion-stable, single-coat and multicoat powder coating applications with excellent metallic appearance, especially as regards luster, brilliance, and lightness, which powder coating applications pigmented with commercial metallic effect pigments have hitherto been impossible to achieve. Moreover, a powder coating of this kind of the invention has an application stability hitherto unachieved with powder coatings pigmented with metallic effect pigments—that is, in the course of application, there is no separation of the powder coating constituents that negatively impairs the surface appearance of the powder coating finish.

Most advantageously the metallic effect pigments of the invention do not contain any fluorine-containing compounds. Accordingly, in the case of the present invention, it is possible to do without the use of fluorine-containing compounds, such as fluorine-containing coating material. Since the polysiloxanes of formula (II) as a starting substance can be provided at very much more favorable cost, the present invention allows the provision of powder coatings of favorable cost and high quality.

The invention further provides a method for producing a powder coating, which comprises the following steps:

(a) mixing, preferably extruding, a metallic effect pigment of any of claims 1 to 9 together with binder and, optionally, further constituents of a powder coating, (b) optionally grinding the extrudate obtained in step (a).

The raw materials used for powder coating production by means of mixing methods, including the metallic effect pigments of the invention, if desired after separate premixing, are processed in a known way in an extruder in the melt into a homogeneous extrudate. The extrudate taken from the extruder, cooled, and comminuted is usually ground conventionally. Powder coating production in this way is described comprehensively in, for example, J. Pietschmann, Industrielle Pulverbeschichtung [Industrial powder coating], 1st ed., October 2002.

The powder coatings which can be produced particularly inexpensively by mixing methods and are pigmented with the metallic effect pigments of the invention may further comprise additional components such as fillers, additives, crosslinkers, pigments, and, if desired, other adjuvants.

The powder coatings pigmented with the metallic effect pigments of the invention can be employed with particular advantage in solvent-free applications in the form of eco-friendly primers or single-layer topcoats in numerous sectors of the metalworking industry, particularly of the automobile and automobile supplier industry, with a virtually complete degree of utilization.

In particular, the powder coating of the invention allows the overspray to be recycled and used again, without any adverse effect on the appearance of the coated article when the overspray is re-used as powder coating. Accordingly, the metallic effect pigments of the invention and the powder coating of the invention permit a hitherto unachieved yield in the powder coating procedure.

The polysiloxane of formula (II) can be obtained by the following general reaction scheme:

(1) reaction of alkyllithium $R^1Li$ (X) with (trimerized) dialkylsilanol $R^2R^3Si(OH)_2$ (III) to give the lithium silanolate (IV):

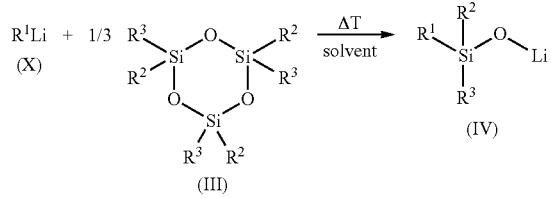

(2) reaction of the lithium silanolate (IV) with (trimerized) dialkylsilanol $R^2R^3Si(OH)_2$(III) to give macromeric silanolate (V):

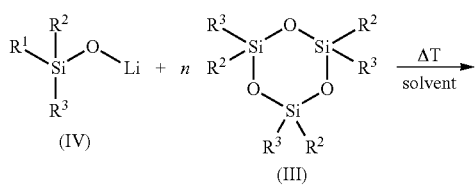

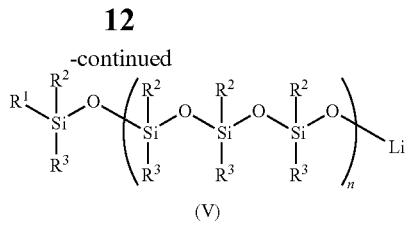

(3) reaction of the macromeric silanolate (V) with dialkylchlorosilane (VI) (termination reaction) to give polysiloxane (VIIa) with terminal hydrogen:

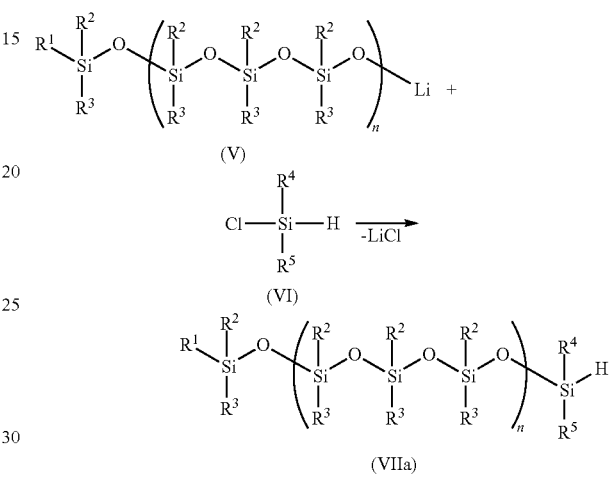

(4) hydrosilylation of the polysiloxane (VIIa) or, in an amended representation, (VIIb), in which x=n/3, with an alkoxyalkylsilane ($Z=OR^9$) or alkylhalosilane (Z=halogen, preferably Cl) (VIII), the compound (VIII) having a terminal ethylenic double bond, to give the polysiloxane (I):

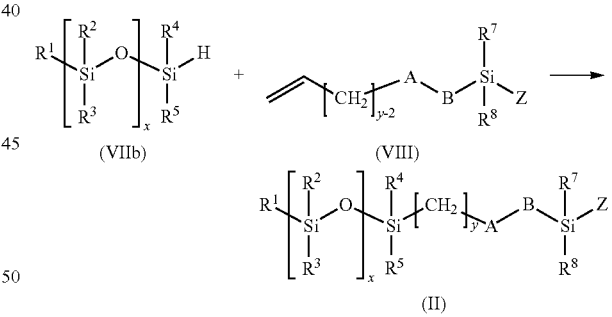

As alkyllithium in step (1) it is possible to use alkyllithium or aryllithium $R^1Li$, where $R^1$ is as defined in claim 1. For example, use may be made of, for example, methyllithium, ethyllithium, sec-butyllithium, n-propyllithium, isopropyllithium, n-butyllithium, sec-butyllithium, tert-butyllithium, n-pentyllithium, neopentyllithium, cyclopentyllithium, n-hexyllithium, cyclohexyllithium, n-octyllithium, 2-ethyllithium, n-phenyllithium, methylphenyllithium or ethylphenyl-lithium, etc.

As dialkylsilanol in step (1) and step (2) it is possible to use, for example, symmetrically or asymmetrically substituted dialkylsilanols $R^2R^3Si(OH)_2$, where $R^2$ and $R^3$ are as defined in claim 1. By way of example it is possible to make use, as symmetrically substituted dialkylsilanols, of dimethylsilanol, diethylsilanol, di-n-propylsilanol, di-isopropylsilanol, di-n-butylsilanol, di-sec-butylsilanol, di-tert-butylsilanol, etc. As asymmetrically substituted dialkylsilanols it is possible to make use, for example, of ethylmethylsilanol, methyl-n-propylsilanol, n-butylmethylsilanol, isobutylmethylsilanol, tert-butylmethylsilanol, ethyl-n-propylsilanol, n-butyl-n-propylsilanol, n-butylethylsilanol, isobutyl-n-propylsilanol, tert-butyl-n-propylsilanol, etc.

Preference is given to using symmetrically substituted dialkylsilanols.

In step (3) it is possible to use symmetrically or asymmetrically substituted dialkylhalosilane, preferably dialkylchlorosilane $HSiR^4R^5Cl$, where $R^4$ and $R^5$ are as defined in claim 1. As symmetrically substituted dialkylchlorosilane it is possible to make use, for example, of dimethylchlorosilane, diethylchlorosilane, di-n-propylchlorosilane, di-isopropylchlorosilane, di-n-butylchlorosilane, di-sec-butylchlorosilane, di-tert-butylchlorosilane, di-n-pentylchlorosilane, di-neo-pentylchlorosilane, di-cyclopentylchlorosilane, di-n-hexylchlorosilane, dicylcohexylchlorosilane, di-n-octylchlorosilane, etc.

As asymmetrically substituted dialkylchlorosilane it is possible to make use, for example, of ethylmethyl-chlorosilane, methyl-n-propylchlorosilane, n-butyl-methylchlorosilane, sec-butylmethylchlorosilane, tert-butyl-methylchlorosilane, n-butyl-ethylchlorosilane, sec-butyl-ethylchlorosilane, tert-butyl-ethylchlorosilane, etc.

As silane in step (4) it is possible to use the compound $(CH_2=CH)-(CH_2)_{y-2}-A-B-SiR^7R^8Z$, where Z is a hydrolyzable group and $R^7$ and $R^8$ independently of one another may be a saturated or unsaturated, straight-chain or branched alkyl radical having 1 to 6 carbon atoms and/or an aryl radical, alkylaryl radical or arylalkyl radical having 6 to 9 carbon atoms and/or may be halogen, preferably Cl, $OR^9$ and/or $O(C=O)R^9$, where $R^9$ is a saturated, straight-chain or branched alkyl radical having 1 to 6 carbon atoms, it being possible for the alkyl radical to comprise O. A and B and also x and y in each case are as defined in claim 1.

The compounds used preferably as alkoxyalkylsilane or alkylchlorosilane in step (4) have a terminal ethylenic group, as for example a terminal alkenyl group such as a vinyl group or allyl group, or a 5-hexenyl radical, 7-octenyl radical or a 10-undecenyl radical. As alkoxy-alkylsilane or alkylchlorosilane it is possible, for example, to use vinyltrichlorosilane, vinyltri-tert-butoxysilane, vinyltriacetoxysilane, vinylphenylmethyl-methoxysilane, vinylphenylmethylchlorosilane, vinyl-phenyldiethoxysilane, vinyldiphenylchlorosilane, vinyl-dimethylethoxysilane, vinyldimethylchlorosilane, 1-vinyl-3-(chloromethyl)-1,1,3,3-tetramethyldisiloxane, vinyl(chloromethyl)dimethylsilane, vinyldimethylethoxy-silane, vinyltris(methoxypropoxy)silane, vinyltris-(2-methoxyethoxy)silane, vinyltrimethoxysilane, vinyl-triisopropoxysilane, vinyltriethoxysilane, vinylphenyldichlorosilane, vinyloctyldichlorosilane, vinylmethyldimethoxysilane, vinylmethyldiethoxysilane, vinylmethyldichlorosilane, vinylmethyldiacetoxysilane, vinyldiphenylethoxysilane, 5-hexenyltrichlorosilane, 5-hexenyldimethylchlorosilane, docosenyltriethoxysilane, butenyltriethoxysilane, butenylmethyldichlorosilane, allyltrimethoxysilane, allyltriethoxysilane, allyltrichlorosilane, allyloxyundecyltrimethoxysilane, allyl-methyldichlorosilane, allyldimethylchlorosilane, allyl-(chloromethyl) dimethylsilane, hexenyltriethoxysilane, vinyldiphenylethoxysilane, 10-undecenyltrimethoxysilane, 10-undecenyltrichlorosilane, 10-undecenyldimethylchlorosilane, styrylethyltrimethoxysilane, 7-octenyltrimethoxysilane, 7-octenyltrimethoxysilane, 7-octenyldimethylchlorosilane, etc.

The hydrosilylation reaction in step (4) is carried out in a usual way, preferably in the presence of a catalyst, as for example hexachloroplatinic(IV) acid at elevated temperature, as for example in the range from 20 to 200° C., preferably from 70 to 150° C.

A preferred embodiment of the polysiloxane for use in producing the metallic effect pigment of the invention is represented in formula (IX)

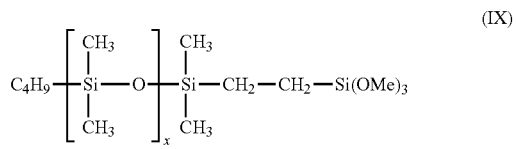

(IX)

where the substituent $C_4H_9$ is preferably n-butyl. The polysiloxane preferably contains an average of 2 to 200, more preferably of 2.5 to 150, more preferably still of 3 to 100, and even more preferably of 3.5 to 50, dimethylsiloxy units. Following hydrolysis of the three methoxy groups to give three OH groups, the compound (IX) thus hydrolyzed is attached, preferably covalently, to the metal oxides of the metallic effect pigments by way of the oxygen atoms.

In one preferred embodiment the metallic effect pigments of the invention are in the form of granules. In this case the granules comprise at least one binder and optionally additives or waxes.

In the granule form the metallic effect pigment can be formulated more easily into the application. The dust load which inevitably occurs when operating with a metallic effect pigment powder can be avoided. The granules can also be formed conventionally into a solid form, to give pellets, tablets, sausages, briquettes or beads.

The binders that are added to the granules are selected in line with the intended application. The pigment granules are used, with particular preference, for powder coatings. The binders in this case preferably correspond to those also used for powder coatings.

The amount of the metallic effect pigment of the invention in the granules is preferably 50% to 95% by weight and more preferably 70% to 90% by weight, based in each case on the overall granules.

The binder fraction is preferably 5% to 30% by weight and more preferably 10% to 20% by weight, based in each case on the overall granules.

EXAMPLES

The invention is illustrated by reference to the examples set out below.

Example 1a

Stage 1: Preparation of an Alpha-N-Butyl-Omega-H-Poly-Dimethylsiloxane Having a Molecular Weight of Around 1960 g/mol 1 mol of n-butyllithium was added dropwise over 30 minutes to 8.3 mol of hexamethylcyclotrisiloxane in 1899 ml of cyclohexane (anhydrous) under a nitrogen atmosphere in a three-neck flask with KPG stirrer with stirring at 28 to 30° C. Thereafter, 1664 ml of THF with a temperature of 25° C. were added dropwise over 15 minutes. The mixture was cooled slightly in order to maintain the temperature at 30° C. The temperature was maintained at 30° C. until the hexamethylcyclotrisiloxane had undergone virtually complete reaction. The degree of reaction was determined by NMR, until the hexa-methylcyclotrisiloxane fraction was ≦1% by weight. The reaction was then terminated by addition of 1.16 mol of dimethylchlorosilane for 0.5 h at 25° C., the reaction temperature being maintained at not more than 30° C. with cooling. During the addition, lithium chloride was precipitated as a white solid. The reaction product (macromeric alpha-n-butyl-omega-H-polydimethylsiloxane) was neutralized by addition of 150 ml of 10% strength aqueous sodium bicarbonate solution. The aqueous phase was subsequently removed by phase separation, and the solvents by means of vacuum distillation at 130° C. and 50 mbar. The product was subsequently filtered through a pressure filter.

Stage 2: Preparation of the alpha-n-butyl-omega-trimethoxysilyl-ethyl-polydimethylsiloxane First of all, 0.5 mol of the neutralized reaction product (macromeric alpha-n-butyl-omega-H-polydimethyl-siloxane) was admixed with 0.7 g of a 6% strength solution of hexachloroplatinic(IV) acid hydrate in isopropanol, and then 0.6 mol of vinyltrimethoxysilane was added over 0.5 h at a reaction temperature of 80 to not more than 120° C. The reaction was monitored by means of determination of Si—H by gas volumetry. Following complete reaction, the excess vinyltrimethoxysilane in the reaction product was removed by means of vacuum distillation at 130° C. and 50 mbar.

Example 1b

Stage 1: Preparation of an Alpha-N-Hexyl-Omega-H-Poly-Dimethylsiloxane Having a Molecular Weight of Around 600 g/mol 1 mol of n-hexyllithium was added dropwise over 30 minutes to 2.5 mol of hexamethylcyclotrisiloxane in 680 ml of cyclohexane (anhydrous) under a nitrogen atmosphere in a three-neck flask with KPG stirrer with stirring at 28 to 30° C. Thereafter, 595 ml of THF with a temperature of 25° C. were added dropwise over 15 minutes. The mixture was cooled slightly in order to maintain the temperature at 30° C. The temperature was maintained at 30° C. until the hexamethylcyclotrisiloxane had undergone virtually complete reaction. The degree of reaction was determined by NMR, until the hexa-methylcyclotrisiloxane fraction was ≦1% by weight. The reaction was then terminated by addition of 1.16 mol of dimethylchlorosilane for 0.5 h at 25° C., the reaction temperature being maintained at not more than 30° C. with cooling. During the addition, lithium chloride was precipitated as a white solid. The reaction product (macromeric alpha-n-hexyl-omega-H-polydimethylsiloxane) was neutralized by addition of 150 ml of 10% strength aqueous sodium bicarbonate solution. The aqueous phase was subsequently removed by phase separation, and the solvents by means of vacuum distillation at 130° C. and 50 mbar. The product was subsequently filtered through a pressure filter.

Stage 2: Preparation of the alpha-n-hexyl-omega-trimethoxysilyl-ethyl-polydimethylsiloxane First of all, 0.5 mol of the neutralized reaction product (macromeric alpha-n-hexyl-omega-H-polydimethyl-siloxane) was admixed with 0.7 g of a 6% strength solution of hexachloroplatinic(IV) acid hydrate in isopropanol, and then 0.6 mol of vinyltrimethoxysilane was added over 0.5 h at a reaction temperature of 80 to not more than 120° C. The reaction was monitored by means of determination of Si—H by gas volumetry. Following complete reaction, the excess vinyltrimethoxysilane in the reaction product was removed by means of vacuum distillation at 130° C. and 50 mbar.

Example 1c

Stage 1: Preparation of an Alpha-N-Butyl-Omega-H-Poly-Dimethylsiloxane Having a Molecular Weight of Around 1100 g/mol 1 mol of n-butyllithium was added dropwise over 30 minutes to 4.8 mol of hexamethylcyclotrisiloxane in 1165 ml of cyclohexane (anhydrous) under a nitrogen atmosphere in a three-neck flask with KPG stirrer with stirring at 28 to 30° C. Thereafter, 1020 ml of THF with a temperature of 25° C. were added dropwise over 15 minutes. The mixture was cooled slightly in order to maintain the temperature at 30° C. The temperature was maintained at 30° C. until the hexamethylcyclotrisiloxane had undergone virtually complete reaction. The degree of reaction was determined by NMR, until the hexa-methylcyclotrisiloxane fraction was ≦1% by weight. The reaction was then terminated by addition of 1.16 mol of dimethylchlorosilane for 0.5 h at 25° C., the reaction temperature being maintained at not more than 30° C. with cooling. During the addition, lithium chloride was precipitated as a white solid. The reaction product (macromeric alpha-n-butyl-omega-H-polydimethylsiloxane) was neutralized by addition of 150 ml of 10% strength aqueous sodium bicarbonate solution. The aqueous phase was subsequently removed by phase separation, and the solvents by means of vacuum distillation at 130° C. and 50 mbar. The product was subsequently filtered through a pressure filter.

Stage 2: Preparation of the alpha-n-butyl-omega-trimethoxysilyl-ethyl-polydimethylsiloxane First of all, 0.5 mol of the neutralized reaction product (macromeric alpha-n-butyl-omega-H-polydimethyl-siloxane) was admixed with 0.5 g of a 6% strength solution of hexachloroplatinic(IV) acid hydrate in isopropanol, and then 0.6 mol of vinyltrimethoxysilane was added over 0.5 h at a reaction temperature of 80 to not more than 120° C. The reaction was monitored by means of determination of Si—H by gas volumetry. Following complete reaction, the excess vinyltrimethoxysilane in the reaction product was removed by means of vacuum distillation at 130° C. and 50 mbar.

Example 2

An inventive gold bronze pigment with surface poly-siloxane modification is prepared by dispersing 100 g of a silicate-coated gold bronze pigment (Dorolan 17/0 rich gold from ECKART) in 200 ml of ethyl acetate and carrying out surface modification by adding 2 g of the additive (alpha-n-butyl-omega-trimethoxysilyl-ethyl-polydimethylsiloxane having a molecular weight of around 1960 g/mol, example 1a) and stirring the mixture at 40° C. for 2 h before removing the solvent under reduced pressure. The inventive powder coating pigment is no different in appearance and particle size from the gold bronze pigment employed as starting material.

For producing the pigment granules, the pigment surface-modified with polysiloxane was subsequently homogenized with 17 g of Lupraphen 8101 (binder based on polyester polyol; from BASF AG) and 7 g of Licowax PE 520 (wax; from Clariant) and the resulting preparation was processed to granules with a length of around 2-10 mm and a diameter of around 2-3 mm.

For all of the subsequent pigments of the inventive examples and of the comparative examples, as well, the pigment was subsequently further-processed into granules. The metallic effect pigment content was always 80% by weight, and 15% by weight of Lupraphen 8101 and 5% by weight of Licowax PE 520 were set, these figures relating to the overall granules.

Comparative Example 3

A conventional gold bronze pigment coated with metal oxide and surface-modified with alkylsilane is prepared as in example 2. For the surface modification of the pigment, rather than the polysiloxane, only the commercial product Dynasylan 9116 (hexadecyltrimethoxysilane) (from Degussa) was used.

Comparative Example 4

Dorolan 17/0 pale gold: silicate-coated gold bronze effect pigment without silane aftertreatment. Available commercially from Eckart GmbH, Germany.

Example 5

A further inventive, $SiO_2$-coated aluminum pigment with surface polysiloxane modification was prepared by dispersing 154 g of a commercial aluminum pigment paste (STAPA Metallic R 507 from ECKART) in 350 ml of isopropanol and 18 g of tetraethoxysilane and also 32 g of water in a 1 liter round-bottom flask equipped with reflux condenser and stirring apparatus. The mixture present was heated to 80° C. and 5 g of triethanolamine were added. After 4 h, 2 g of the additive of example 1a were added for surface modification. The reaction mixture was slowly cooled and the pigment was separated off by filtration, washed with isopropanol, and dried in a vacuum drying cabinet at 100° C.

Example 6

For preparing a further inventive, $SiO_2$-coated aluminum pigment with surface polysiloxane modification, the procedure of example 5 was repeated. Instead of the commercial aluminum pigment paste (STAPA Metallic R 507 from ECKART), only a commercial, uncoated aluminum pigment (Stapa 20 nl from ECKART) having an average particle size of around 10 µm was used.

Example 7

For preparing a further inventive, $SiO_2$-coated aluminum pigment with surface polysiloxane modification, the procedure of example 5 was repeated. Instead of the commercial aluminum pigment paste (STAPA Metallic R 507 from ECKART), only a commercial, uncoated aluminum pigment (STAPA Metallux R 272 from ECKART) having an average particle size of around 50 µm was used.

Example 8

For preparing a further inventive, $SiO_2$-coated aluminum pigment with surface polysiloxane modification, the procedure of example 5 was repeated. Instead of the commercial aluminum pigment paste (STAPA Metallic R 507 from ECKART), only a commercial, uncoated aluminum pigment (STAPA Metallux R 274 from ECKART) having an average particle size of around 35 µm was used.

Example 9

A further inventive aluminum pigment with surface polysiloxane modification was prepared by dispersing 100 g of a commercial, silicate-coated aluminum pigment (PCS 2000 from Eckart, average particle size around 20 µm) in 200 ml of isopropanol and stirring the mixture, for surface modification, with 2 g of the additive (alpha-n-butyl-omega-trimethoxysilyl-ethyl-polydimethylsiloxane having a molecular weight of around 1960 g/mol, example 1a) at 40° C. for 2 h, after which the solvent was removed under reduced pressure. In terms of visual appearance and particle size, the powder coating pigment of the invention is no different from the aluminum pigment used as starting material.

Example 10

For preparing a further inventive, $SiO_2$-coated aluminum pigment with surface polysiloxane modification, the procedure of example 9 was repeated. Instead of the alpha-n-butyl-omega-trimethoxysilyl-ethyl-polydimethyl-siloxane having a molecular weight of around 1960 g/mol (example 1a), only an alpha-n-hexyl-omega-trimethoxysilyl-ethyl-polydimethylsiloxane having a molecular weight of around 600 g/mol (example 1b) is used.

Example 11

For preparing a further inventive, $SiO_2$-coated aluminum pigment with surface polysiloxane modification, the procedure of example 9 was repeated. Instead of the alpha-n-butyl-omega-H-polydimethylsiloxane having a molecular weight of around 1960 g/mol (example 1a), only an alpha-n-butyl-omega-H-polydimethylsiloxane having a molecular weight of around 1100 g/mol (example 1c) is used.

Comparative Example 12

A conventional aluminum pigment with $SiO_2$ coating was produced in accordance with example 5. Instead of the polysiloxane used for surface modification, though, the commercial product Dynasylan 9116 (from Degussa) (an alkylsilane) was used.

Comparative Example 13

A further conventional aluminum pigment without $SiO_2$ coating was coated with polysiloxane from example 1a. This is done by suspending 154 g of commercial aluminum pigment paste (Stapa Metallic R507 from Eckart; average particle size around 20 µm) in 350 ml of isopropanol, heating the suspension to 80° C., and adding 2 g of the additive under example 1a with stirring. After 4 h, the reaction mixture was slowly cooled and the pigment was separated off by filtration, washed with isopropanol, and dried in a vacuum drying cabinet at 100° C.

Comparative Example 14

PCS 2000: Silicate-coated aluminum effect pigment without further surface aftertreatment, having an average particle size of 20 µm. Available commercially from Eckart GmbH, Germany.

Comparative Example 15

PCS 5000: Silicate-coated aluminum effect pigment without further surface aftertreatment, having an average particle size of approximately 50 μm. Available commercially from Eckart GmbH, Germany.

Inventive Example 16 and Comparative Examples 17-18

A gold-bronze-colored powder coating was produced by mixing 100 g of a gold bronze preparation or pigment as per table 1 below with 900 g of a commercial powder clearcoat (AL96 from DuPont) and extruding the mixture in a screw extruder at 120° C. The extrudate was fractionated and processed using an impact feed mill into a powder coating. The powder coating was applied to Q-Panels (baking temperature: 200° C., baking time: 10 minutes). Colorimetry took place using a CM-508i colorimeter from Minolta.

The abrasion resistance was carried out with a Washability apparatus from Braive Instruments. The metal carriage, which runs over the coating surface under test with the speed setting of level 1, was modified with a layer of rubber. The frictional counterpart used was black paper, which is placed beneath the modified metal carriage. As a quality feature, a measurement was made of the difference in lightness (ΔL*) between the initial state and the state after 20 back-and-forth strokes, both on the black paper and on the metal sheet.

TABLE 1

| Example | Pigment | Appearance (subjective impression) | L* | ΔL* metal sheet* | ΔL* paper | Abrasion resistance |
|---|---|---|---|---|---|---|
| Example 16 | Pigment of example 2 | brilliant, metallic | 59.1 | 0.14 | 1.2 | high |
| Comparative example 17 | Pigment of comparative example 3 | brilliant, metallic | 59.3 | 1.9 | 2.2 | low |
| Comparative example 18 | Pigment of comparative example 4 | dark, brownish | 48.17 | 0.41 | 0.0 | very high |

The powder coatings of example 16 and of comparative example 18 gave high to very high abrasion resistances. This fact is evident metrically from the comparatively lower ΔL* values. A comparison of the colorimetric properties, however, shows that high lightnesses L* and color strengths C* are obtained only in the case of example 16 and comparative example 17. The abrasion resistance in comparative example 17 is low, however. The pigments of comparative example 4 have to a large extent been destroyed in the powder coating after the grinding step on the extrudate. Since these pigments do not have leafing properties, the eventual visual impression is one which can hardly be called metallic.

Accordingly, only the pigments of the invention with metal oxide coating and also with a surface modification which contains polysiloxanes exhibit both appealing optical qualities (high lightness, high brilliance) and good abrasion resistance.

Examples 19 to 25 and Comparative Examples 26-29

A powder coating pigmented with aluminum pigments was produced by mixing 100 g of an aluminum pigment as per table 2 below with 900 g of a commercial powder clearcoat (AL96 from DuPont) and extruding the mixture in a screw extruder at 120° C. The extrudate was fractionated and processed using an impact feed mill into a powder coating. The powder coating was applied to Q-Panels (baking temperature: 200° C., baking time: 10 minutes). Colorimetry of the applied powder coating took place using a CM-508i colorimeter from Minolta.

The abrasion resistance was carried out with a Washability apparatus from Braive Instruments. The metal carriage, which runs over the coating surface under test with the speed setting of level 1, was modified with a layer of rubber. The frictional counterpart used was black paper, which was placed beneath the modified metal carriage. As a quality feature, a measurement was made of the difference in lightness (ΔL*) between the initial state and the state after 20 back-and-forth strokes, both on the black paper and on the metal sheet.

TABLE 2

| Example | Pigment used | Appearance (subjective impression) | L* | ΔL* metal sheet | ΔL* paper | Abrasion resistance |
|---|---|---|---|---|---|---|
| Example 19 | Pigment from example 5 | brilliant, metallic | 76.7 | 0.22 | 2.04 | high |
| Example 20 | Pigment from example 6 | brilliant, metallic | 79.6 | 0.3 | 2.5 | high |
| Example 21 | Pigment from example 7 | brilliant, metallic | 80.3 | 0.3 | 2.4 | high |
| Example 22 | Pigment from example 8 | brilliant, metallic | 78.1 | 0.2 | 3.3 | high |
| Example 23 | Pigment from example 9 | brilliant, metallic | 73.0 | 0 | 1.0 | very high |
| Example 24 | Pigment from example 10 | brilliant, metallic | 73.9 | 0 | 1.1 | high |
| Example 25 | Pigment from example 11 | brilliant, metallic | 75.4 | 0 | 1.8 | high |
| Comparative Example 26 | Pigment from comparative example 12 | brilliant, metallic | 75.84 | 0.58 | 6.83 | low |
| Comparative Example 27 | Pigment from comparative example 13 | dark, grey | 53.86 | 0 | 0 | very high |

TABLE 2-continued

| Example | Pigment used | Appearance (subjective impression) | L* | ΔL* metal sheet | ΔL* paper | Abrasion resistance |
|---|---|---|---|---|---|---|
| Comparative Example 28 | Pigment from comparative example 14 | dark, grey | 54.71 | 0.14 | 0.79 | high |
| Comparative Example 29 | Pigment from comparative example 15 | dark, grey | 54 | 0 | 0 | very high |

The values in table 2 demonstrate that the powder coating applications comprising metallic effect pigments of the invention have substantially improved appearance in terms of metallic brilliance and lightness, and also a better abrasion resistance, than powder coatings with conventional metallic effect pigments without surface polysiloxane modification.

Furthermore, the powder application according to comparative example 27, where a powder coating was used which comprises a polysiloxane-treated aluminum pigment without a metal oxide layer, does not exhibit good optical properties. Similar results were shown by comparative examples 28 and 29, where the effect pigments had only a metal oxide layer. Comparative examples 27-29 make it clear that, for pigment preparations which do not contain either the metal oxide layer or polysiloxane surface modification, the metal pigment is so severely damaged by the mechanical forces that occur during extrusion, and subsequently in the course of grinding, that appealing visual properties are no longer obtained.

The alkylsilane-treated aluminum pigment did display good optical properties in the powder coating, induced by the floating of pigments which in mechanical terms are largely undamaged. In this case, however, the abrasion resistance was low (comparative example 26).

Only the pigments of the invention (and the associated powder coatings), therefore, exhibited the combination of a good, appealing appearance and high to very high abrasion resistance.

What is claimed is:

1. Metallic effect pigments with a platelet-shaped metallic substrate, the metallic pigments comprising at least one metal oxide layer having a surface, wherein
    the surface of the metal oxide layer has covalently bonded thereto polysiloxane of the formula I:

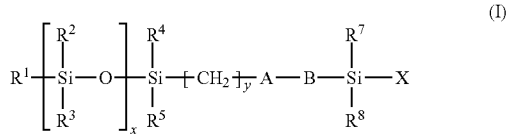

(I)

where
    $R^1$ is selected from the group consisting of a saturated or unsaturated, straight-chain or branched alkyl radical having 1 to 30 carbon atoms and an aryl radical, alkylaryl radical and arylalkyl radical having 6 to 30 carbon atoms;
    each of $R^2$, $R^3$, $R^4$ and $R^5$ independently of one another is selected from the group consisting of saturated or unsaturated, straight-chain or branched alkyl radicals having 1 to 6 carbon atoms and aryl radicals, alkylaryl radicals and arylalkyl radicals having 6 to 12 carbon atoms;
    x=1 to 200,
    y=2 to 30;
    A is $(CH_2)_n$, O, S, $(OCH_2CH_2)_m$ or $C_6R^6_4$, where n=0 or 1 and m=0 to 30 and $R^6$ is selected from the group consisting of H and alkyl having 1 to 6 carbon atoms;
    B is $(CH_2)_z$ or $(OCH_2CH_2)_w$, z=0 or 30 and w=0 to 30; and
    $R^7$ and $R^8$ independently of one another are selected from the group consisting of O, a saturated or unsaturated, straight-chain or branched alkyl radical having 1 to 6 carbon atoms, an aryl radical, alkylaryl radical and arylalkyl radical having 6 to 9 carbon atoms, where X is O or OH and is attached to the pigment surface.

2. The metallic effect pigments of claim 1, wherein
    the metal oxide coating substantially envelops the platelet-shaped substrate.

3. The metallic effect pigments of claim 1, wherein
    $R^2$, $R^3$, $R^4$ and $R^5$ independently of one another are saturated alkyl radicals.

4. The metallic effect pigments of any of claim 3, wherein
    $R^2$, $R^3$, $R^4$ and $R^5$ are methyl.

5. The metallic effect pigments of claim 1, wherein
    $R^1$ is methyl, ethyl, sec-butyl, n-propyl, isopropyl, n-butyl, sec-butyl, tert-butyl, n-pentyl, neopentyl, cyclopentyl, n-hexyl, cyclohexyl, n-octyl, 2-ethylhexyl, phenyl, methylphenyl or ethylphenyl.

6. The metallic effect pigments of claim 1, wherein
    y=2 to 6 and A is $(CH_2)_n$, where n=0, and B is $(OCH_2CH_2)_w$, where w=0 to 6.

7. The metallic effect pigments of claim 1, wherein
    the metallic effect pigments have a metal oxide content of 0.1% to 50% by weight, based on the total weight of the metallic effect pigment.

8. The metallic effect pigments of claim 1, wherein
    the metallic effect pigments have a formula (I) polysiloxane content of 0.1% to 10% by weight, based on the total weight of the metallic effect pigment.

9. The metallic effect pigments of claim 1, wherein
    the metallic effect pigments are in the form of granules, the granules comprising at least one binder.

10. A method for producing metallic effect pigments as claimed in claim 1, wherein
    the surface of the metal oxide layer is reacted with a polysiloxane of the formula (II)

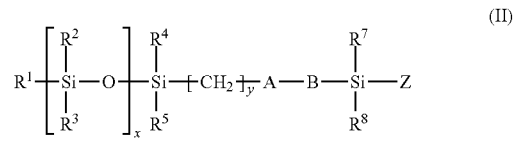

(II)

where Z is a hydrolyzable group and $R^7$ and $R^8$ independently of one another are each a hydrolyzable group or $R^7$ and $R^8$ independently of one another are are selected from the group consisting of a saturated or unsaturated, straight-chain or branched alkyl radical having 1 to 6 carbon atoms, an aryl radical, alkylaryl radical and arylalkyl radical having 6 to 9 carbon atoms.

11. The method of claim 10,
wherein the hydrolyzable group is selected from the group consisting of halogen, $OR^9$ and $O(C{=}O)R^9$, where $R^9$ is a saturated, straight-chain or branched alkyl radical having 1 to 6 carbon atoms.

12. A method for producing a material selected from the group consisting of coating materials, printing inks, cosmetic formulations and plastics, wherein the method comprises combining said material with the metallic effect pigments of claim 1.

13. A method for producing a powder coating which comprises combining a powder coating with the metallic effect pigments of claim 1.

14. A powder coating comprising at least one binder and at least one metallic effect pigment of claim 1.

15. A method for producing a powder coating, which comprises:
(a) mixing a metallic effect pigment of claim 1 together with a binder.

16. A method for forming a coated substrate selected from the group consisting of metal, metal foils, plastic, glass, glass fibers, composite materials, ceramic, wood, concrete, textile material, and woodbase materials, said coated substrate comprising the powder coating as claimed in claim 14 upon at least a portion of the substrate.

17. A coated substrate
wherein
the substrate is coated with metallic effect pigments as claimed in claim 1.

18. The metallic effect pigments of claim 2,
wherein
the enveloping metal oxide coating comprises at least one of oxides and oxide hydrates of silicon, titanium, zirconium, iron, aluminum, cerium, chromium and mixtures thereof.

19. The metallic effect pigments of claim 3,
wherein
the saturated alkyl radicals are at least one selected from the group consisting of methyl, ethyl, n-propyl, isopropyl, n-butyl, sec-butyl and tert-butyl and an aromatic radical.

20. The metallic effect pigments of claim 19, wherein the aromatic radical is phenyl.

21. The metallic effect pigments of claim 9, wherein the granules further comprise at least one selected from the group consisting of an additive and a wax.

22. The method of claim 11, wherein the alkyl radical comprises oxygen.

23. The method of claim 15, wherein the mixing step comprises extruding.

24. The method of claim 23, further comprising grinding the extrudate obtained in step (a).

25. A coated substrate wherein the substrate is coated with a powder coating comprising metallic effect pigments as claimed in claim 1.

\* \* \* \* \*